United States Patent Office 3,553,236
Patented Jan. 5, 1971

3,553,236
PSORALENE AND ISOPSORALENE, PROCESS FOR THEIR ISOLATION AND SEPARATION
Antoine Hascher, Bombay, India, assignor to Franco-Indian Pharmaceuticals Private Limited, Bombay, India, a corporation
No Drawing. Filed Dec. 6, 1968, Ser. No. 781,997
Int. Cl. C07d 7/36
U.S. Cl. 260—343.2      3 Claims

---

ABSTRACT OF THE DISCLOSURE

Psoralea corylifolia seeds are crushed, the essential oil containing the active principle is extracted by an organic solvent such as benzene and psoralene is precipitated by adding a hydrocarbon to the extract and isopsoralene is crystallized from mother liquor.

---

This invention relates to the production of furano-coumarin derivatives e.g. psoralene and isopsoralene from *Psoralea corylifolia* seeds.

*Psoralea corylifolia* plants grow in large quantities in the plains of India, particularly in Madhya Pradesh and some parts of Gujarat and Maharashtra. It is a dark-brown coloured seed, about 2 mm. in length, rectangular and stout. It is hard, has a tender skin, a pleasant odor and a bitter acrid taste. The seeds are commonly known as "babchi" and in Sanskrit it is called "Vakuchi."

The extracts of *Psoralea corylifolia* have been used in Indian ayurvedic medicine for the treatment of psoriasis, leucoderma, leprosy and other skin diseases.

According to Sen, Chatterjee and Dutta, Indigenous Drugs of India by R. N. Chopra (Art Press, Calcutta) 368, 1933 and Chopra and Chatterjee, Indian Journal of Medicinal Research 15, 49 (1927), the seeds mentioned above have the following composition:

(i) 20.15% of a pale yellow, non-saponifiable essential oil;
(ii) 13.5% of extractable material, albumin and sugar; and
(iii) 7.5% of an ash coloured product and a trace of manganese.

The essential oil (i) contains 2 furano-coumarin derivatives as shown below:

(a) Psoralene ($C_{11}H_6O_3$) has the following formula

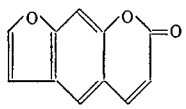

Formula 1

It is a yellow white crystalline substance having a melting point of 162° C.

(b) Isopsoralene ($C_{11}H_6O_3$) has the following formula:

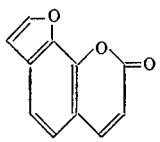

Formula 2

It is a pale yellow crystalline substance having a melting point of 142° C.

Several processes to obtain the furano-coumarin derivatives mentioned above are known, viz:

(i) Journal of Indian Academic Sciences, 5A, 357 (1937).

(ii) B. Mukherjee, J. Sc. Ind. Res., vol. 15A, Supplement 5.
(iii) S. J. Das Gupta, P. C. Roy, Research Lab. B.C.P.W., Cal.
(iv) Council of Scientific and Industrial Research, Indian patent specification No. 59265 of Feb. 1, 1957.
(v) Council of Scientific and Industrial Research, Indian patent specification No. 59266 of Feb. 1, 1957.

However, the processes described in literature published hitherto cannot be profitably carried out on an industrial basis, particularly in view of the fact that the separation of the isomers, psoralene and isopsoralene is not at all easy. In view of the difficulties encountered in the separation, some authors recommend utilising a mixture of isomers. The mixture of the isomers has a melting point 120° C.

The object of the present invention is to effect a simultaneous isolation and separation of pure psoralene and isopsoralene from *Psoralea corylifolia* seeds.

According to this invention, in a process for the isolation and separation of the furano-coumarin derivatives psoralene and isopsoralene from *Psoralea corylifolia* seeds the steps comprise:

(i) purification and defecation of said seeds by crushing and sieving, followed by washing with water;
(ii) extraction of dehusked, crushed and partially purified seeds with a suitable solvent, e.g. toluene, benzene or chloroform, under superincumbent conditions;
(iii) separation of natural oils from the essential oil containing the active principles obtained as an extract in step (ii) by repeated washing of the said extract by a dilute base, e.g. NaOH;
(iv) quantitative precipitation of psoralene by addition of kerosene, white spirit (stoddard solvent) or a similar hydrocarbon after distilling off the solvent with which extraction of the seeds are carried out, whereupon psoralene crystallizes from the precipitation medium;
(v) crystallization of isopsoralene from the mother liquor obtained after removal of psoralene by chilling the said mother liquor; and, if desired,
(vi) purifying the products by recrystallizing them from denatured spirit (denatured alcohol) to which a little activated charcoal has been added.

EXAMPLE

To carry out the process of the present invention the following procedure may be followed:

*Psoralea corylifolia* seeds are powdered to particle size which passes a screen of, say, 30 mesh size, and are sieved at a sieve of the mesh size mentioned above. About 40% of the husk is thus eliminated. The crushed and purified yellowish seeds are stirred for 12 to 24 hours in water (10 times their weight) at room temperature; an ash grey precipitate separates out from this solution. Filtration is carried out on a 30 mesh sieve and the seeds are washed in running water till the filtrate is perfectly clear. The residue is processed as below.

100 grams of these crushed and purified seeds are stirred for 12 to 24 hours at room temperature with 400 ml. of toluene or benzene. A limpid dark red mixture is thus obtained. The said mixture is filtered under vacuum or is centrifuged. The residual seeds are free from the furano-coumarin derivatives, particularly psoralene. To verify this, a small quantity of extracted seeds can be shaken in alcohol. The alcoholic suspension is filtered and to the filtrate a few drops of a mixture of 3 parts of propylene glycol and 5 parts of crystallisable acetic acid in 43 parts of water are added. In case the solution appears turbid, it may be further filtered. When exposed to ultraviolet light source, intense blue fluorescence is observed.

Incidentally it may be noted that isopsoralene does not show this characteristic feature.

The blue fluorescence disclosed above may be observed even without the addition of alkylene glycols; a similar feature may be observed when some seeds are shaken with acetic acid diluted in water. Likewise, any solution of psoralene in a solvent, preferably alcoholic solvents, to which 2 to 3 drops of crystallisable acetic acid and an equal amount of water has been added, shows a blue ultraviolet fluorescence.

The filtrate obtained from the organic solvent extract of the crushed and purified seeds contains a mixture of essential oils, fixed oil and resins as well as the compounds psoralene and isopsoralene. In order to separate the various ingredients the organic filtrate is washed with a dilute solution of caustic soda. A dark coloured oil gradually separates and is removed by decantation. The solvent layer is thereafter washed to neutrality with water and the washings are removed by successive decantation. The solvent is filtered and distilled under vacuum whereby a small quantity of a brown oil remains (say about 6 grams), which contains psoralene and its isomer.

Psoralene precipitates in almost pure state immediately upon addition of kerosene, stoddard solvent or a similar solvent, while its isomer remains in solution. The whole system is allowed to stand overnight and then filtered under vacuum; about 0.5 gram of the slightly yellowish product is obtained having a melting point of 158 to 160° C. The filtrate containing the iso-compound is placed in a refrigerator for 2 to 3 days, whereupon isopsoralene separates out almost quantitatively, having a melting point of 140° C. The yield is about 0.2 gram.

The two compounds may be obtained pure by recrystallizing them from denatured spirit to which a little activated charcoal has been added.

The process described above is only by way of example and could be employed for obtaining other natural products of interest, for instance, ammoidine having the following structure may be prepared from *Ammi majus*, an Egyptian plant containing several furano-coumarin derivatives:

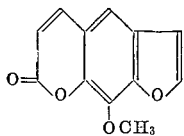

Formula 3

Compounds described above have very remarkable medicinal properties. Hence, they may be converted into pharamaceutically administrable forms.

What we claim is:

1. A process for the isolation and separation of the furano-coumarin derivatives psoralene and isopsoralene from *Psoralea corylifolia* seeds comprising the following steps:
   (i) purification and defecation of said seeds by crushing and sieving, followed by washing with water;
   (ii) extraction of dehusked, crushed and partially purified seeds with a suitable solvent, e.g. toluene, benzene or chloroform under superincumbent conditions:
   (iii) separation of natural oils from the essential oil containing the active principles obtained as an extract in step (ii) by repeated washing of the said extract by a dilute base;
   (iv) quantitative precipitation of psoralene by addition of kerosene, stoddard solvent or a similar hydrocarbon after distilling off the solvent with which extraction of the seeds is carried out, whereupon psoralene crystallizes from the precipitation medium; and
   (v) crystallization of isopsoralene from the mother liquor obtained after removal of psoralene by chilling the said mother liquor.

2. The process set forth in claim 1, in which the dilute base used in washing the extract comprises sodium hydroxide solution.

3. The process set forth in claim 1, in which the products are purified by recrystallizing the same from denatured alcohol to which a small amount of activated charcoal has been added.

References Cited

Khastgir et al., Chemical Abstracts, vol. 54, col 12275, (1960).

Mustafa, "Furopyrans and Furopyrones," Interscience Pub., New York (1967), pp. 16, 17, and 23.

HENRY R. JILES, Primary Examiner

J. M. FORD, Assistant Examiner

U.S. Cl. X.R.

260—999